Nov. 8, 1966 P. A. HARDING 3,284,784

NOISE REDUCTION CIRCUIT

Filed March 15, 1962 5 Sheets-Sheet 1

INVENTOR
P. A. HARDING
BY Charles Scott Phelan
ATTORNEY

INVENTOR
P. A. HARDING
BY
Charles Scott Phelan
ATTORNEY

INVENTOR
P. A. HARDING
BY *Charles Scott Phelan*
ATTORNEY

INVENTOR
P. A. HARDING
BY
Charles Scott Phelan
ATTORNEY

NO COMPLEMENTING

FOLDED PLANE

TYPE I
ROW CROSSING

TYPE II
ROW CROSSING

INVENTOR
P. A. HARDING
BY
Charles Scott Phelan
ATTORNEY

United States Patent Office 3,284,784
Patented Nov. 8, 1966

1 2

3,284,784
NOISE REDUCTION CIRCUIT

Philip A. Harding, Middletown, N.J., assignor to Bell Telephone Laboratories, Incorporated, New York, N.Y., a corporation of New York Filed Mar. 15, 1962, Ser. No. 179,870
18 Claims. (Cl. 340—174)

This invention relates to an electric signal conductor arrangement for reducing the net signal which is coupled to one of two such conductors as a result of signal current transmission in the other conductor. The invention is described in connection with a magnetic memory module, but it is not limited to use in connection with such devices.

A magnetic memory module may comprise a plurality of magnetic storage devices such as toroidal magnetic cores or apertured sheets of ferrite material wherein each aperture functions in much the same manner as a separate toroidal core. Each such core has a substantially rectangular hysteresis characteristic, and it may be switched to different parts of such characteristic by the application of electric pulses of certain polarities and magnitudes to conductors threaded through the core. The storage devices are advantageously arranged in a suitable array, such as a three-dimensional array, wherein individual devices or groups of devices may be addressed in a convenient coordinate system by the application of electric signal pulses to appropriate signal leads electromagnetically engaging particular groups of the devices. A sensing lead also engages particular groups of devices for producing an electric signal indication in response to a change of magnetic condition in the device, or group, which is addressed.

Details of arrangements and operations for many different types of magnetic memory arrays are well known in the art. Most such arrays require the application of some type of precautionary measure to reduce the effects of undesired signal impulses that may be coupled to the memory sense lead from other portions of the memory. In typical prior art arrays the coupling means for these impulses takes the form of electromagnetic coupling to the sense lead through the various magnetic memory devices from one or more of the memory drive leads engaging the devices for addressing purposes. Noises generated in the sense lead in this fashion have magnitudes and occurrence times that are not conveniently predictable. Accordingly, a designer usually finds that the speed of operation of a magnetic memory is limited primarily by the recovery time of the sense lead following noise coupling thereto, and that the memory speed is limited only secondarily by the switching speed of the individual memory devices.

The effects of the aforementioned electromagnetic noise coupling are conventionally reduced by various noise cancellation techniques wherein noise signals induced in one portion of a sense lead are offset against signals induced in another portion of the sense lead. In one particular application of such techniques, a three-dimensional memory array is divided into two similar arrays of submodules so that the sense lead may place one submodule in the opposite direction from which it laces the other; and the induced noise pulses then tend to be canceled. Many other cancellation schemes for electromagnetically coupled noise have been disclosed in the prior art.

Recently, ferrite sheet memories have been gaining in popularity. In these memories a sheet of ferrite material is pierced in a plurality of locations in accordance with a prearranged plan and so treated that each of the resulting apertures has magnetic characteristics similar to those found in the more conventional toroidal magnetic cores. Memories which utilize pierced ferrite sheets are subject to another type of noise coupling, in addition to the usual electromagnetic coupling, to the sense lead. This new type of coupling is capacitive coupling between the sense lead and at least one of the memory drive, or control, leads. The capacitive coupling arises because the drive and sense conductors in a ferrite sheet memory are usually much closer to one another than they are in prior art core memories. Frequently the leads are in contact with one another with the conductor insulation preventing direct current coupling between the leads. This contact is directly due to the fact that the apertures in the ferrite sheets place a definite restriction upon the space available for memory control and sensing conductors.

Control and sense leads in a sheet memory are usually connected in electric circuits having a common ground plane. Electric signals in a control lead are capacitively coupled to other nearby leads by distributed capacity therebetween, and as a result the signals suffer transmission distortion. Of principal interest in magnetic memories is such capacitive coupling between a control lead and the sense lead. Because of this distortion, the conventional noise cancellation techniques are not effective in suppressing the effects of the capacitive coupling. Briefly, the reason that conventional techniques are not effective in the presence of substantial control signal transmission distortion is that changes in the control signal configuration as a result of the mentioned transmission distortion cause noise signals of different configurations to be coupled through the distributed capacitance between leads to the different parts of the sense lead. Obviously, one noise signal cannot be employed to cancel fully another noise signal of different configuration. Prior art noise cancellation techniques do not consider such variably shaped noise pulses, and they have been found to produce totally inadequate noise cancellation insofar as capacitively coupled noise is concerned.

It is, therefore, one object of the present invention to reduce the effects of undesired electric signal coupling between signal translation circuits.

Another object of the invention is to turn to advantage the transmission distortion effects which in present noise reduction schemes produce inadequate results.

A further object is to utilize known transmission distortion, which heretofore resulted in imperfect noise cancellation, as an advantageous device for reducing the effect of undesired signal coupling between electric circuits.

Another object is to improve magnetic memory systems.

A supplementary object is to provide a conductor arrangement theorem for guiding designers of magnetic memories in working out conductor winding patterns.

These and other objects of the invention are realized in an illustrative embodiment of an electric signal translation circuit wherein two signal-carrying leads are so arranged in separate circuits that the distributed capacity between the leads permits signal coupling therebetween. The effects of such coupling are reduced by having some portions of a first one of the leads coupled to corresponding portions of the second one of the leads with a current direction *a* which is the same as the current direction in the corresponding portion of the second lead and by having other portions of the first lead coupled to additional second lead portions with a current direction *b* which is opposite to the current direction in the second lead. These different current directions *a* and *b* tend to produce some cancellation of the coupling effects in the first lead. In addition, the first lead portions are constrained to follow the same circuit paths as the second lead portions, but in a different sequence, to establish *a–b* current patterns of predetermined forms in groups of first lead portions. The patterns and groups are arranged so that the remanent effects of an imperfect cancellation in one group of first lead portions are at least partially offset by similar effects in another group.

It is one feature of the invention that the different groups of the first lead portions are arranged to produce complementary cancellation effects by complementing one another as to one or more of the factors: (*a*) pattern form, (*b*) electric current direction in the second lead with respect to different groups of first lead portions with which the lead is associated, and (*c*) the nature of signal distortion in different parts of the second lead.

Another feature of the invention is that groups of first lead portions may be arranged in a geometrically, expanded, complementary, *a–b* pattern wherein each half of each part of the pattern produces noise concellation effects which are complementary with respect to the effects produced by the other half.

Still another feature of the invention is that the complementing in first lead groups may be extended to use in a three-dimensional array of magnetic devices to reduce coupling effects between electric conductors which engage magnetic devices in more than one column of the array in common, or between end links of conductors where such conductors pass between columns of the array, or between a conductor in one plane of an array and other conductors in adjacent planes of array.

A realization of additional objects and advantages of the invention, as well as a complete understanding of the invention and its potential applications, may be gained from a consideration of the following detailed description, and the appended claims, when taken together with the attached drawings in which:

Figures 1, 2:
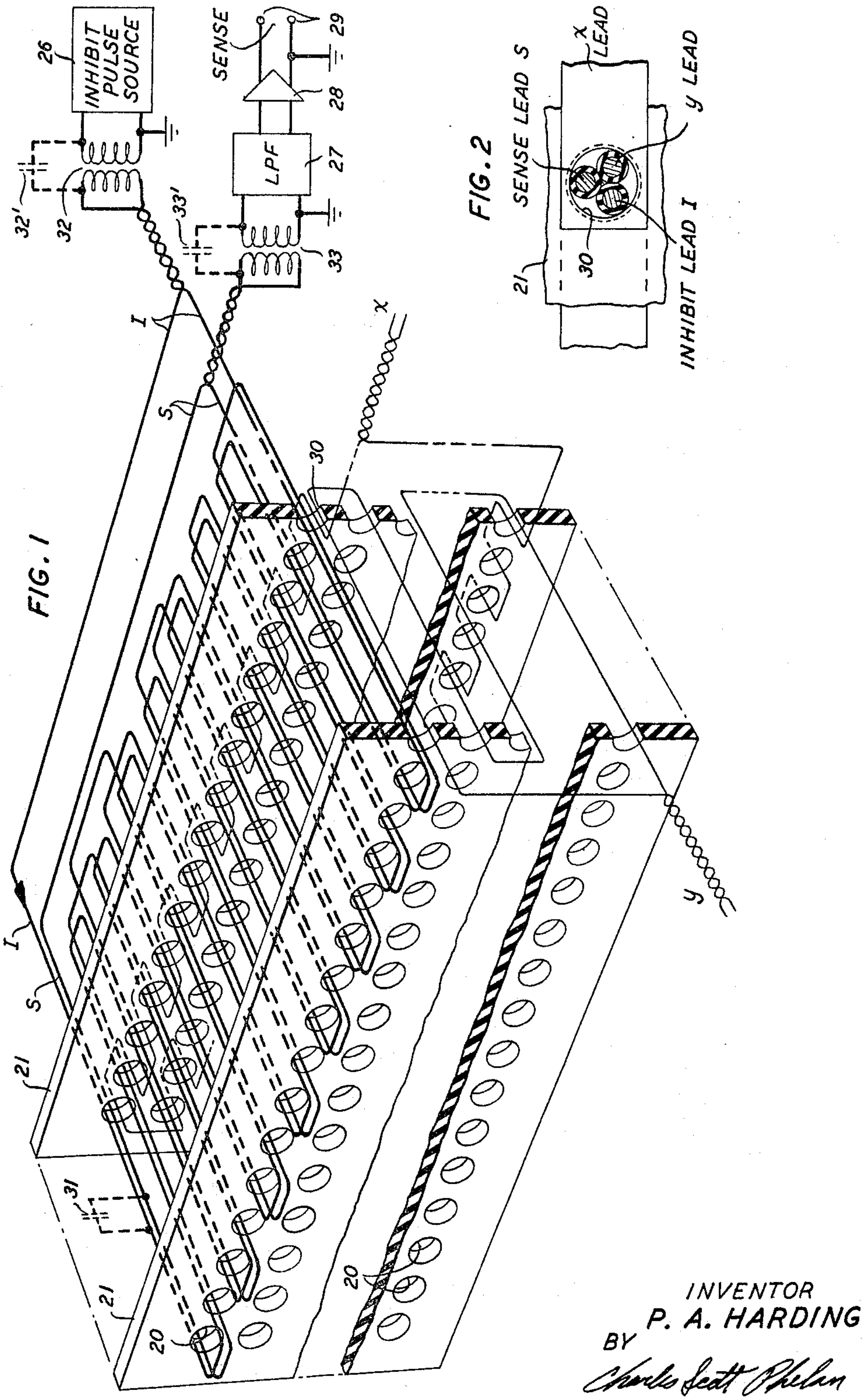
FIG. 1 is a simplified diagram of a magnetic memory array utilizing one embodiment of the invention.
FIG. 2 is an enlarged view of a portion of FIG. 1.

In FIG. 1 there is shown a perspective view of a magnetic module of the type which includes a three-dimensional array of magnetic storage devices and in which the devices may be addressed by rectangular coordinates. In this case the devices are apertures, such as the aperture 20, in a plurality of sheets 21 of ferrite material. Such sheets are sometimes called "pierced" ferrite sheets. Each aperture is treated in a manner known in the art so that the portion of ferrite material defining the aperture has a substantially rectangular hysteresis characteristic. An apertured sheet portion so treated may be employed as a switchable magnetic storage device, and is hereinafter interchangeably designated a storage device or a core. The module which is illustrated may be used as an independent unit or it may be utilized as one submodule in combination with one or more similar submodules in a manner which is well known in the art. The sheets 21 may have any suitable dimensions as indicated by the fact that the right-hand portion of each of the sheets 21 is broken away and by other conventional drafting notations indicating that the memory module may include any desired number of apertures in each sheet and may include any desired number of ferrite sheets.

The particular memory illustrated in FIG. 1 is a bit-oriented memory, i.e., control and sense leads are adapted for writing in or reading out at a single core the information bit magnetically stored therein. All of the apertures in each sheet are laced by a different *x* lead, only one of which is shown, so that a half-select signal may be applied, from a source that is not shown, to the cores of that sheet to initiate a core selection. In a similar manner, all of the apertures in each of a plurality of planes which are perpendicular to the sheets 21 are laced by a different *y* lead, only one of which is shown, for similarly applying a half-select signal from a source, not shown, to all of the apertures in one of the latter planes. Thus, upon application of half-select signals of the same polarity in the illustrated *x* and *y* leads of the memory, all cores in the column which is engaged by both of these leads are switched thereby to the magnetic condition indicated by such signals.

An inhibit current pulse source 26 applies pulse signals to an inhibit lead I, only one of which is shown, which laces all of the cores of a third plane that is perpendicular to the *x* lead planes as well as the *y* lead planes. Pulses from this source may typically be of opposite polarity from those applied to either the *x* or the *y* lead and are designed to inhibit the switching of a core which is linked by one of each of the *x*, *y*, and I leads. For example, in one known magnetic memory an inhibit pulse may be applied during a write-in operation. The *x* and *y* pulses applied simultaneously therewith address all cores in the vertical column which includes core 30 of FIG. 1. The inhibit pulse, if applied, is of opposite polarity from the *x* and *y* pulses and prevents switching of core 30 to the condition indicated by the *x* and *y* pulses. Other cores in the same column with core 30 may be switched unless they are threaded by a simultaneously activated inhibit lead. Assuming no other activated inhibit leads, all remaining cores threaded by the illustrated *y* lead tend to be activated around a minor hysteresis loop, but they are not switched. All other cores threaded by the illustrated *x* lead also tend to be activated around a minor hysteresis loop; but those in the same row with core 30 are at least partially restrained by the pulse in the illustrated inhibit lead, which also threads all cores in the same row as core 30.

As illustrated by FIG. 1, the inhibit lead I comprises the total load on the inhibit current pulse source 26. A transformer 32 couples the output of source 26 to a twisted pair of conductors, and lead I extends from one conductor of the pair through the memory module and back to the pair as illustrated. One terminal of source 26 is grounded.

A sense lead S, only one of which is shown, also laces all of the same core apertures which are laced by a corresponding one of the inhibit leads. This sense lead is coupled through a twisted conductor pair and a transformer 33 to the input of a low-pass filter 27 which has one of the input terminals thereof connected to ground.

An amplifier 28 couples the output of filter 27 to sense output terminals 29. One of these terminals 29 is also grounded. It can now be seen that only one aperture in the entire memory illustrated in FIG. 1 is engaged by any particular combination of *x*, *y*, and S leads. This one aperture in FIG. 1 is the aperture of core 30.

In accordance with the invention, sense lead S engages the same memory core apertures which are engaged by inhibit lead I. The two leads are constrained by the cores to traverse circuit paths defined by the various columns of the memory in different sequences which are designed to produce a particular type of pattern for a noise signal complementing effect, as will be subsequently described in greater detail.

FIG. 2 shows in enlarged form the portion of the ferrite sheet from FIG. 1 which includes core 30. FIG. 2 shows an actual lead arrangement which is characteristic of all of the sheet apertures in FIG. 1. Thus, the $x$ lead may be a strip conductor which is deposited upon portions of the ferrite sheet surface and on the interior edge surfaces of the apertures to effect the lacing of successive apertures by the lead in opposite directions. The $y$, I, and S leads are actual conductors with insulation thereover of any suitable material, such as varnish. It can be seen in the drawing that these last three leads with their insulating coatings are of such diameter that they cannot occupy the aperture without lying extremely close to, or physically contacting, one another. This type of arrangement is typical of ferrite sheet memories since it reduces the amount of space required for a magnetic memory; and space has, of course, achieved considerable importance as a precious commodity.

One result of the tight aperture arrangement shown in FIG. 2, and indeed a result which gives rise to the present invention, is that there is distributed capacity among the leads. In particular, the S and I leads are so close together that a distributed capacitance exists along portions of these leads which are adjacent to one another. Such capacitance, indicated schematically by a capacitor 31 in FIG. 1, permits capacitive coupling of inhibit pulse signals between the sense and inhibit leads. A similar relationship exists between the S and $y$ leads, but these two leads share only a single column of cores in the memory array and produce a relatively small coupled noise. The S and I leads engage all of the same columns of cores and produce in the S lead the largest component of capacitively coupled noise unless preventive measures are adopted. Since the distributed capacity between the S and I leads is of major importance in ferrite sheet memories, it is the one which will be utilized in describing the various embodiments of the present invention. Insofar as coupling between the S and I leads is concerned, the I lead may be considered to be a source lead and the S lead a driven, signal lead.

Figure 3:
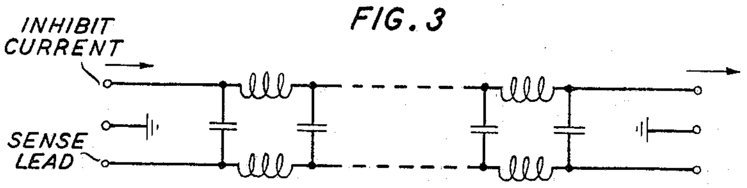
FIG. 3 is an equivalent circuit of two conductors which are capacitively coupled in the manner previously described.

FIG. 3 shows a simplified equivalent circuit for the FIG. 1 circuit elements including the inhibit lead I, the sense, or read-out, lead S, and the distributed capacity between the two leads. This equivalent circuit comprises a transmission line with the two conductors thereof balanced with respect to ground. Those two conductors correspond to the sense and inhibit leads, respectively, of FIG. 1. Each conductor includes series coils representing the distributed self inductance of the lead, and shunt-connected capacitors represent the distributed capacity between the leads. The coils shown in FIG. 3 also represent the inductive effect upon the leads of the magnetic core apertures which are electromagnetically engaged by the leads. It is well known, of course, that in a circuit of the type illustrated in FIG. 3 a pulse applied between ground and the inhibit lead may suffer substantial distortion during transmission from one end of the lead to the other; and this distortion may take the form of both amplitude and delay distortion.

Figure 4:
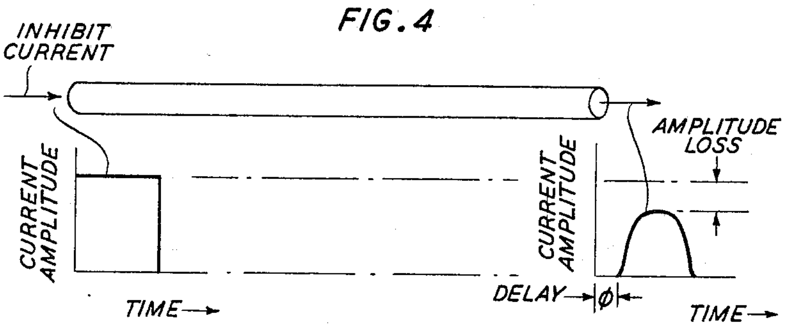
FIG. 4 is a group of diagrams illustrating deformation of an electric pulse during transmission through a conductor in the environment of FIG. 3.

FIG. 4 includes conductor and pulse diagrams illustrating the distortion effect, mentioned in connection with FIG. 3, for a section of the inhibit lead. In FIG. 4 a rectangular current pulse is applied to the left-hand end of the lead as illustrated. This pulse appears at the right-hand end of the lead portion with the illustrated rounded and delayed configuration.

It will be recalled that in FIG. 1 transformers 32 and 33 isolate leads S and I from ground connections on source 26 and filter 27, respectively. The circuit loops formed by the secondaries of these transformers and leads S and I float off ground and are capacitively coupled together by the distributed capacity therebetween. It is also known that current leaving a source must equal the current returning to it. Accordingly, any component of current that is shunted away from the inhibit lead by distributed capacity should ideally be returned to the inhibit lead before the circuit returns to transformer 32. A current pulse that is deformed in the outgoing portion of the inhibit lead by the effects of distributed capacity is then also reformed by similar effects in the return portion of the lead. The relative lengths of the deform and reform portions of the inhibit lead depend upon factors such as the spacing between leads in the portions considered and the effects produced by other adjacent circuits.

If the deforming and reforming functions could always be perfectly performed, there would be no net noise in the sense lead due to coupling through distributed capacity. However, a variety of factors prevent perfect theoretical operation. One of these factors is the effect of transformer winding capacitance represented by capacitors 32' and 33' in FIG. 1. The latter capacitance permits some current to find a return path through ground so that the deform and reform functions within lead I are not perfect. Additional steps must, therefore, be taken to reduce sense lead noise resulting from the distributed capacity effects. Imperfect noise cancellation results if prior art techniques are used to combat noise coupled to the sense lead through distributed capacity, but in accordance with the invention the actual deform-reform effect, and other devices, are used advantageously to improve cancellation of such noise.

Figures 5A, 5B, 5C, 5D, 5E, 5F:
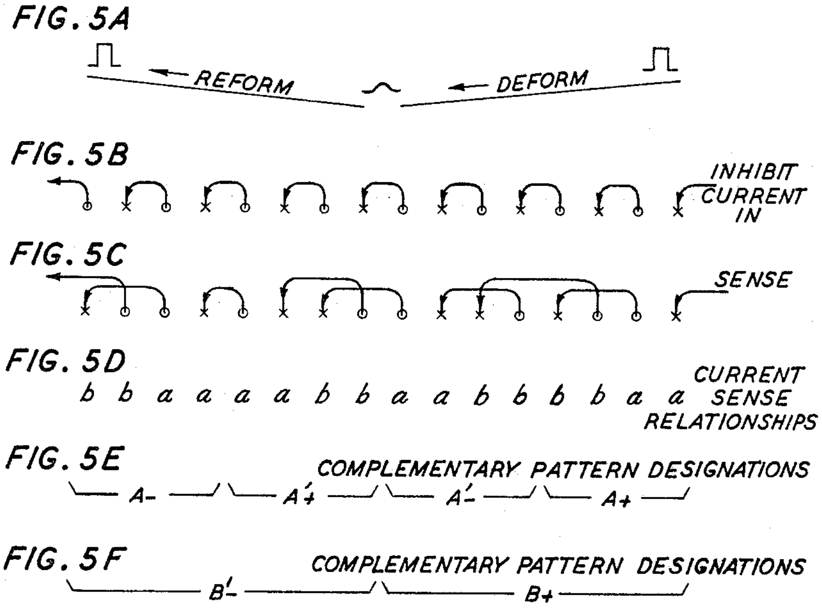
FIGURES 5A–5F are a group of diagrams illustrating a simplified notation for depicting electric conductor arrangements.

In FIG. 5 a series of six diagrams is shown to develop a simplified type of wiring notation which is used for demonstrating various embodiments of this invention. The diagram of FIG. 5A comprises simply two lines with opposite slopes symbolizing the effects of the mentioned distortion upon a current pulse which may be applied to an electric circuit by a current source. The pulse on the outgoing lead from a current source may have a sharp rectangular configuration as illustrated at the right-hand end of FIG. 5A. This pulse is deformed during transmission along the outgoing portion of the lead as indicated by the downward, right-to-left slope of the deform line in FIG. 5A. At the midpoint of the lead portion, which is assumed to be exposed to substantially uniform distributed capacitive influences, the pulse has the rounded shape illustrated in the center of FIG. 5A. During transmission through the return portion of the lead to the current source, the pulse is reformed into approximately its original rectangular configuration as indicated by the upward, right-to-left slope of the reform line.

FIGS. 5B and 5C include two series of representations indicating current directions as they may be seen in the end views of the sense lead I and inhibit lead S at the back of the memory module of FIG. 1. Thus, inhibit current from pulse source 26 enters FIG. 5B at the right-hand side and enters the plane of the drawing, as indicated by the "X" at that point, representing entry into the first column of cores in the I plane of FIG. 1. Current in the lead emerges from the memory at the rearmost core aperture of the next memory column to the left as indicated by the circle in FIG. 5B, and it re-enters the memory at the next succeeding column to the left as indicated by the second "X." This same pattern is continued in FIG. 5B for the sixteen columns of core apertures engaged by inhibit lead I in FIG. 1. Thus, current in this lead traverses the paths represented by these columns in a continuous numerical sequence extending from one through sixteen from right-to-left in FIG. 5B. This same pattern can be observed in FIG. 1 by looking down on the top of the illustrated memory module and considering that the inhibit pulse current enters the module in the left-hand column of core apertures as indicated by the arrow on the lead I in that column. Current then proceeds through each of the successive columns traced by the same inhibit lead I and passes through each of those columns in a direction which is opposite to the direction taken by the current in passing through the preceding column of the sequence.

In a similar manner, the arrangement for the sense lead to engage the same columns of core apertures in the memory of FIG. 1, but in a different sequence in accordance with the invention, is shown in the diagram in FIG. 5C. Although the sense lead conducts no currents except those induced therein at the core apertures of the memory or those coupled thereto through distributed capacity from one of the other control leads of the memory, it is assigned an arbitrary over-all current direction in FIG. 5C which is the same as the over-all current direction for the inhibit lead. That is, it is assumed that current in the sense lead enters in the right-hand portion of FIG. 5C and leaves at the left-hand portion. This assumption is made for convenience in describing the various embodiments of the invention. The diagram for the sense lead also represents the end view of the sense lead as seen from the back of the module of FIG. 1; and, in the diagrammatic representation of FIG. 5C, the same "X" and circle representations are utilized to indicate assumed current entering and leaving, respectively, the columns of the memory as seen from the back of the module. The assumed current direction in the sense lead is, then, a convenient device for establishing column lacing patterns for the sense lead.

Thus, beginning at the right-hand side of FIG. 5C, the sense current direction in the first two columns of the matrix is the same as the inhibit current direction in the same columns. This is represented by the letter *a* in each of these column position in FIG. 5D. However, the sense lead then skips from the second to the fourth column to reenter the memory, and it thereafter emerges from the third column. Thus, in the third and fourth columns the sense current direction is opposite to the inhibit current direction as indicated by the letter *b* in FIG. 5D. The letters *a* and *b* may conveniently be considered to have the cannotations "aiding" and "bucking," respectively, for current directions which are the same as, or opposite from, respectively, those in the corresponding inhibit lead portions. Expressed somewhat differently, it may be said that the inhibit current proceeds in numerical sequence through columns 1 through 4, from right to left, in FIG. 5B. The current direction of the sense lead proceeds, also in numerical sequence, through columns 1 and 2; and the current direction proceeds in reverse numerical sequence in columns 3 and 4. Accordingly, the sense lead portion in the latter columns is in series opposing relationship with respect to the sense lead portion in columns 1 and 2 insofar as the inhibit current sequence and the distributed capacity are involved in relating those two sense lead portions.

It should be understood at this point that because of the series opposing relationship between the sense lead portions in columns 1 and 2 as compared to columns 3 and 4, the inhibit current signals coupled to these two portions of the sense lead tend to oppose one another and the effects thereof tend to be canceled. However, by referring back to FIG. 5A it will be recalled that the inhibit pulse configuration in columns 1 and 2 is different from the configuration in columns 3 and 4 since the pulse is deformed somewhat by the time that it reaches the latter two columns. Accordingly, the inhibit signal coupled through distributed capacity to the sense lead portions in columns 1 and 2 has a larger magnitude, here assumed to be positive with respect to ground, than the negative current pulse coupled to the sense lead portions in columns 3 and 4. The result of this difference is an imperfect cancellation; and the net, or remanent, signal in the sense lead after transmission through columns 1 through 4 is a positive pulse of rather small magnitude.

Further in accordance with the invention, the sense lead is caused to pass through the second group of four columns in the memory in accordance with a current direction pattern which is the complement, or mirror image, of the current direction pattern characterizing the sense lead arrangement in the first four columns. A net negative coupled signal is thus produced by the second group and tends to cancel the net signal from the first group. In other words, the two patterns together produce a net coupled signal in the sense lead that is less than the net coupled signal of either of the two patterns individually.

In FIG. 5D the current direction pattern established between the inhibit and sense leads in the first four columns of the memory, considered in the sequence in which the inhibit current traverses those columns, is *a–a–b–b*. This corresponds to a sense lead lacing pattern X · · X for those columns as shown in FIG. 5C and wherein the circles of the drawing correspond to the dots in the text. The complement of the current direction pattern for the second group of four columns is *b–b–a–a* as shown in FIG. 5D, and of the lead lacing pattern is ·XX· as shown in FIG. 5C. Subsequent discussion herein is directed primarily to current direction relationship patterns using the *a–b* symbology since they constitute a single, convenient, device for relating current directions in both the inhibit and the sense leads. However, the underlying sense lead lacing patterns must be kept in mind as will become apparent in further discussion of the invention.

The current direction pattern for the first four columns is designated A as shown in FIG. 5E, and the complementary form of that pattern is designated A′. Polarity signs associated with the over-all pattern designations in FIG. 5E, and in other figures, indicate the polarity with respect to ground of the net signal coupled from the inhibit lead to the sense lead portion covered by the pattern.

Because of the continued deformation of the inhibit pulse as it traverses the second group of four columns in the memory, the inhibit signal coupled to the sense lead portions in columns 5 and 6 is of larger magnitude and of opposite polarity with respect to the inhibit signal which is coupled to the sense lead portions in columns 7 and 8. Thus, the net coupled signal in the sense lead portions in columns 5 through 8 is of the same polarity, negative, as the signal coupled to the sense lead in columns 5 and 6. It will be recalled, however, that this is opposite to the polarity of the remanent signal in columns 1 through 4. Thus, the net remanent signals in the first two groups of sense lead portions in columns 1 through 4 and 5 through 8 are of opposite polarity. They tend, therefore, to cancel; and they produce a net coupled signal in the sense lead portions traversing columns 1 through 8 which has a smaller magnitude than the remanent signal from either of the two groups and which is of the same polarity as the inhibit signal which is coupled to columns 1 and 2. FIG. 5F shows that the overall pattern in the first eight columns is designated B+.

The sense lead next laces eight additional columns of the memory in accordance with a current direction pattern which is the complement of the pattern established by the sense lead in lacing cores of all preceding columns of the memory. Thus, the complementary pattern is designated B′. By analyzing the B′ lead portions of the memory columns represented in FIG. 5B in the same fashion that the lead portions in pattern B were analyzed, it is found that the pattern B′ produces a net cancellation effect which is of opposite polarity from the net effect of the pattern B. A minus sign is, therefore, associated wtih the B′ pattern in FIG. 5F. The over-all net effect of coupling through the distributed capacity to the sense lead patterns B+ and B′− from the inhibit lead is a signal which is of smaller magnitude than is the net coupled noise in any of the patterned subgroups making up a larger pattern group. Thus, although the mentioned deform and reform effects on inhibit current pulses tend to reduce noise coupled to the sense circuit, the use of complementary current relationship patterns assures still more reduction of noise.

The particular embodiment of the invention represented by the sense and inhibit leads shown in FIG. 1, and by the special lead winding notation for these leads in the memory which is shown in FIG. 5, may be the subject of some additional observations. Thus, it will be noted in FIG. 5 that the current direction pattern established by the sense lead in relation to the inhibit lead sequence comprises two halves B and B′, and each of these halves is the complement of the other insofar as current direction patterns are concerned and insofar as coupled signal cancellation is concerned. Note that the sense lead lacing patterns in the two halves of the over-all pattern are also of complementary form. Furthermore, each of those patterns B and B′ is made up of two subpatterns A and A′ which are the complements of one another in a similar fashion. This arrangement of complementing patterns may be extended to larger numbers of lead portions by utilizing the same technique of adding groups of sense lead portions which are equal in number to all sense lead portions existing prior to the addition and which are formed into a current direction pattern that is the complement, or mirror image, of that illustrated in FIG. 5D. Likewise, although a basic pattern A was utilized in FIG. 5, different basic patterns using the same number of lead portions or a different number may be employed. Naturally, it follows that dissimilar successive patterns with complementary effects could also be employed.

The series of current direction patterns illustrated in FIG. 5 may also be generally stated as an arithmetic relationship, or algorism, which expresses the size of successive, complementary groups of lead portions that may be added after a basic group size is established with $n$ lead portions. Accordingly, additional, successively larger groups of lead portions may be added if the number of lead portions in each such additional group is equal to $n \cdot 2^{(a-1)}$, where $a$ is an integer corresponding to the ordinal number of the added group. The indicated expression for group size will be recognized as a geometrical progression. Thus, in FIG. 5 the basic group is the A+ pattern group of four lead portions so that $n=4$. For the first added group, A′−, $a=1$; and the number of lead portions added is four in accordance with the mentioned algorism. Similarly, the second added group, B′−, must have eight lead portions.

FIGS. 5E and 5F show a polarity sign adjacent to each of the letter designations for the various current direction patterns. This sign indicates, as previously mentioned, the net resulting polarity of coupled signal in the sense lead for the particular pattern under consideration, always recalling, however, that pattern progression is assumed in FIG. 5 to be in the direction of inhibit lead progression through the previously mentioned numerical sequence of memory columns. Thus, in FIG. 5F the B+ pattern produces a net coupled signal in the sense lead which is positive in polarity if it is assumed that signals coupled to the sense lead portions with aiding current direction $a$ are positive as previously described. In like manner, the B′− pattern produces a net negative signal which tends to cancel the net positive signal of the B+ pattern.

In summary, with respect to FIG. 5 it can be observed that "complementing" as used in this application is not only signal cancellation, but also successive cancellation functions wherein each function offsets against one another the difference signals remaining from two previous cancellations. Stated in different terms, a first order cancellation is accomplished between signals coupled to a lead, and at least one additional higher order of cancellation is accomplished between cancellation-error signals from a lower order of cancellation. In accordance with the invention, this form of cancellation results in an increase in the effectiveness of the noise cancellation in an electric signal circuit which is coupled by distributed capacity to another circuit. The complementing of the present invention takes different forms in accordance with the variables of inhibit lead current direction, type of current direction pattern which is employed, the sense lead lacing pattern, and the nature of inhibit signal deformation or reformation in the inhibit lead portions which are associated with certain sense lead portions by a particular current direction pattern. Four particular combinations of these factors are separately illustrated in FIGS. 7 through 10. It is to be understood, however, that many other combinations are possible to meet different situations. Before considering FIGS. 7 through 10 in detail, it may be helpful to refer to FIG. 6 which illustrates the effect of inhibit current reversal.

Figures 6A, 6B, 6C:
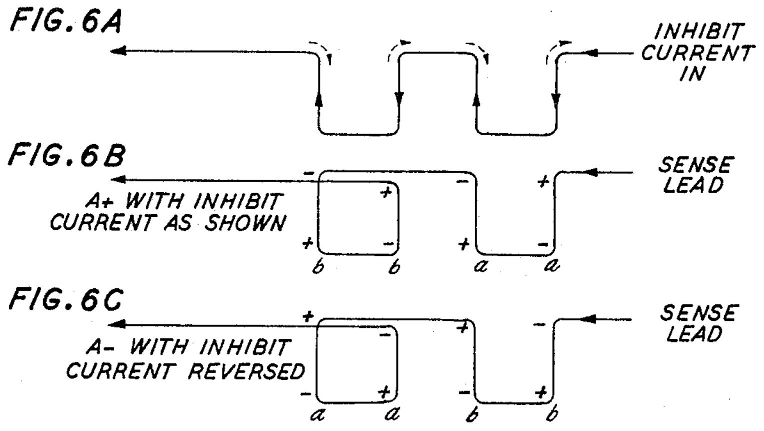
FIGURES 6A–6C illustrate the manner of derivation of certain symbology used in FIG. 5.

FIG. 6 shows in detail the effect of inhibit current direction upon the sense lead once a lead lacing pattern has been established. Inhibit current is first assumed to enter the inhibit lead from the right and proceed through four memory columns as shown in FIG. 6A. The latter figure corresponds to the four columns at the right-hand side of FIG. 5B. The sense lead of FIGS. 6B and 6C is laced through the same four columns in the same pattern X · · X illustrated in FIG. 5C. This establishes in FIG. 6B the *a–a–b–b* current direction relationship pattern of FIG. 5D to produce a net positive coupled signal so that the pattern may be designated A+. FIG. 6B shows on the A+ sense lead the polarity signs indicating column-by-column the manner in which the net positive signal is achieved, recalling that an inhibit pulse is being deformed by the distributed capacity as it travels from right to left through the inhibit lead.

If now it is assumed that the inhibit current in FIG. 6A is reversed (as shown by broken line arrows), and the lead lacing arrangements are not changed, the current relationship pattern remains *a–a–b–b* if considered in the new inhibit current direction. However, the net coupled signal in the sense lead is now negative and the sense lead pattern is designated A−. FIG. 6C shows on the A− lead the polarity signs indicating column-by-column the manner in which the net negative signal is achieved. Thus, once a sense lead lacing pattern is established, the polarity of the signal coupled thereto can be reversed by reversing the direction of current in inhibit lead portions associated with the sense lead portions in that lacing pattern.

Figure 7:
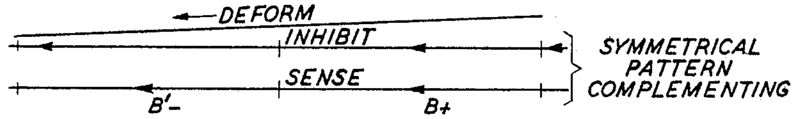
FIGS. 7 through 10 illustrate extensions of the aforementioned notation utilized to demonstrate different aspects of the invention.

FIG. 7 shows an example of symmetrical pattern complementing wherein successive B and B′ sense lead patterns are utilized in association with an inhibit lead having current direction from right to left as indicated by arrowheads in the figure and wherein the portion of the inhibit lead which is illustrated is assumed to be connected in the current deforming part of the inhibit circuit. Both the B and B′ patterns progress from right to left for the lead lacing patterns as indicated by their respective arrowheads. Given the lead lacing pattern and direction and the inhibit current direction, the current direction relationship pattern may be easily determined.

The B pattern produces a positive coupled signal in the same fashion as the B pattern in FIG. 5F. The B′ pattern now produces a negative coupled signal the same as in FIG. 5F although in FIG. 7 it is associated with a deform portion of the inhibit lead while in FIG. 5 it was associated with a reform portion of the inhibit lead. This result for the B′ pattern in FIG. 7 is due to the fact that the B′ represents a symmetrical current direction pattern. A different result may be obtained if either the current direction pattern or the lead lacing pattern were nonsymmetrical as will be subsequently described. It is further noted with respect to FIG. 7 that pattern complementing is effective for noise reduction even though only one type of inhibit signal distortion is present in the circuit portions considered.

Figure 8:
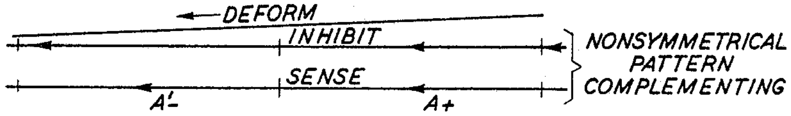

In FIG. 8 successive A and A′ patterns are both associated with the deform portion of a source lead. These patterns progress from right to left as indicated by the arrowheads on the sense circuit lines. The patterns are nonsymmetrical with respect to current direction relationships as may be seen by comparing FIGS. 5D and 5E. In FIG. 8 the two patterns produce net coupled signals of opposite polarity for a complementing cancellation effect upon the coupled signal because of the changing inhibit signal configuration in combination with the inversion of current relationship patterns. Thus, pattern complementing may be employed as shown in FIGS. 7 and 8 to reduce effects of distributed capacity coupling.

Figure 9:
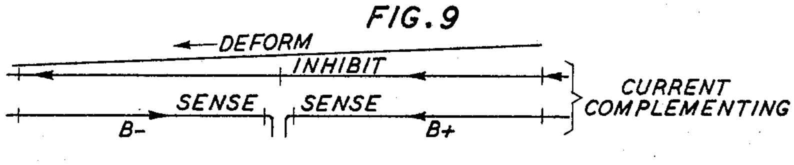

FIG. 9 illustrates current complementing using two sense lead current relationship patterns B that are symmetrical. It must be recalled, however, that the sense lead lacing inherent in the pattern B is not symmetrical. The inhibit current progresses through its lead pattern from right to left. The sense lead lacing directions for the two B patterns are in opposite directions as indicated by their respective arrows. Another part of the sense circuit that is not shown connects the sense lead groups in series. The two B patterns are in series opposing relationship with respect to the current in the inhibit lead. This series opposing relationship produces net coupled signals of opposite polarity, with respect to the common ground plane, in the two B patterns.

Figure 10:
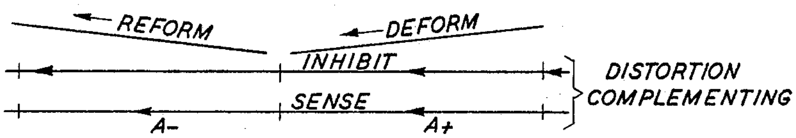

In FIG. 10 identical nonsymmetrical patterns of the A type are utilized to perform distortion complementing. Each pattern is associated with a different type of inhibit signal distortion, and each pattern progresses from right to left as indicated by arrowheads on the schematic representations of the patterns. The right-hand A pattern is associated with the deform portion of the inhibit lead to produce a net positive coupled signal and he left-hand A pattern is associated with a reform portion of the inhibit lead to produce a net negative coupled signal. The identical patterns thus produced complementary noise cancellation effects tending to achieve complete cancellation.

Further, in accordance with the invention, some of the various combinations of patterns, current directions, and inhibit signal distortion directions are utilized to produce additional embodiments to advantageously achieve improved signal-to-noise ratios in magnetic memory systems. Thus, in FIG. 11 two planes of the memory may each be arranged in somewhat the same fashion previously described in connection with FIG. 5. Inhibit and sense leads in one plane are connected in series with their counterparts in the next plane to reduce somewhat the amount of wiring required external of the memory module. This is called a folded plane complementary wiring scheme; and, in addition to reducing the amount of external wiring, it also facilitates the use of further complementary variations for attacking different sources of coupled noise signals. Arrowheads on the sense and inhibit leads show the directions of inhibit lead and sense lead pattern progression through the memory in the two planes.

In the end view under consideration the two planes may be treated as rows and are designated "row $i$" and row "$i+1$." Following the inhibit lead sequence, it can be seen that rows $i$ and $i+1$ include exactly the same series of current direction patterns to relate sense and inhibit leads. However, net coupled signals for the two rows are found to be of opposite polarities. The reason for the different polarities of the net signals in the two rows is obvious when it is realized that the entire portion of the inhibit lead in row $i$ is a deform portion, such as that illustrated in FIG. 7; but the entire portion of the inhibit lead in row $i+1$ is a reform portion. Accordingly, the net positive signal produced by the B+ pattern in row $i$ is larger than the net negative signal produced by the B′− pattern in that row. However, the positive signal produced by the B+ pattern in row $i+1$ is of smaller magnitude than the negative signal produced by the B′− pattern in row $i+1$. Thus, within each of the two rows of FIG. 11 symmetrical pattern complementing is practiced, but when the two rows are considered together distortion complementing is practiced to produce in combination complementary cancellation effects.

Figure 12:
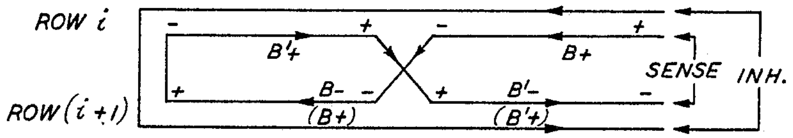

FIG. 12 illustrates an extension of folded plane complementary wiring which is called type I row crossing.

Figure 11:
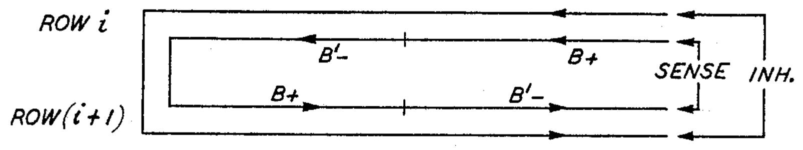
FIGS. 11 through 13 are additional embodiments of the invention illustrated in accordance with the aforementioned conductor notation.

This embodiment of the invention includes the benefits of folded plane complementary wiring as described in connection with FIG. 11, and it also provides further complementing to reduce the effects of distributed capacity coupling between the end links of the inhibit and sense leads at the back side of the memory system of FIG. 1. It may be observed in FIG. 1 that end links of the inhibit lead as it passes from one column of core apertures to another all carry inhibit current from left to right on both the front and back sides of the memory. However, if the sense lead is traced in the previously assumed current direction, i.e. entering the memory in the left-hand column shown in FIG. 1, it will be observed that its end links on the front side of the memory of FIG. 1 have current directions of alternate polarities. There is, thus, a certain amount of cancellation of coupled signals in the front links of the sense lead. However, it can be seen from FIG. 5B and from tracing the sense lead in FIG. 1 that the end links of that lead on the back side of the memory all have the same current direction with respect to one another and with respect to the end links of the inhibit lead in that region. It has been found that, once a form of complementary wiring is adopted to suppress the effects of capacitive coupling within the memory columns, the aforementioned end link coupling between the sense and inhibit leads at the back of the memory module becomes significant. In FIG. 12 this end link coupling effect is substantially reduced by causing the sense lead to cross over from one row to the other after traversing one-half of a memory plane represented by a row.

Thus, in FIG. 12 the sense lead traverses a B+ pattern in row $i$ followed by a B− pattern in row $i+1$ and B′+B′− patterns in rows $i$ and $i+1$ in that order. The exterior pair of patterns in FIG. 12, that is the patterns at the respective ends of the sense lead, are complementary types associated with deform and reform portions, respectively, of the inhibit lead. Both exterior patterns are also associated with inhibit lead pulses which are immediately adjacent to the inhibit current source; and, therefore, the pulses have substantially the same configuration. This combination of complementary patterns and similar pulses enhances the noise cancellation effects of those patterns. By a similar token, the interior patterns in FIG. 12 are associated with inhibit lead portions which are equally remote from the inhibit current source and thus also have inhibit pulses of substantially the same configuration. Within the groups of the exterior and interior patterns, respectively, pattern complementing is employed; and current complementing is used when the patterns are considered in the sense lead sequence. These factors all cooperate to assure optimum cancellation of signals which are capacitively coupled to the sense lead within the memory columns.

By comparing pattern progression directions as indicated by arrowheads on the four patterned sections of the sense lead in FIG. 12 it may be seen that the current complementing is employed to reduce noise signals coupled to the sense lead in its end link portions. The end link coupled signal polarities are indicated by polarity signs at the ends of each schematic pattern representation. Noise signals are of opposite polarity with respect to one another in the initial two B pattern sections of the lead, and the end link couplings in the succeeding B′ pattern portions are also of opposite polarity with respect to one another. Furthermore, the net coupled end link signal in the two B patterns is positive and that in the B′ portions is negative as a result of distortion factors. This then is a form of distortion complementing. Thus, the folded plane row crossing scheme of FIG. 12 permits many of the variables of complementing to be utilized for suppressing both end link and column coupling effects.

Figure 13:
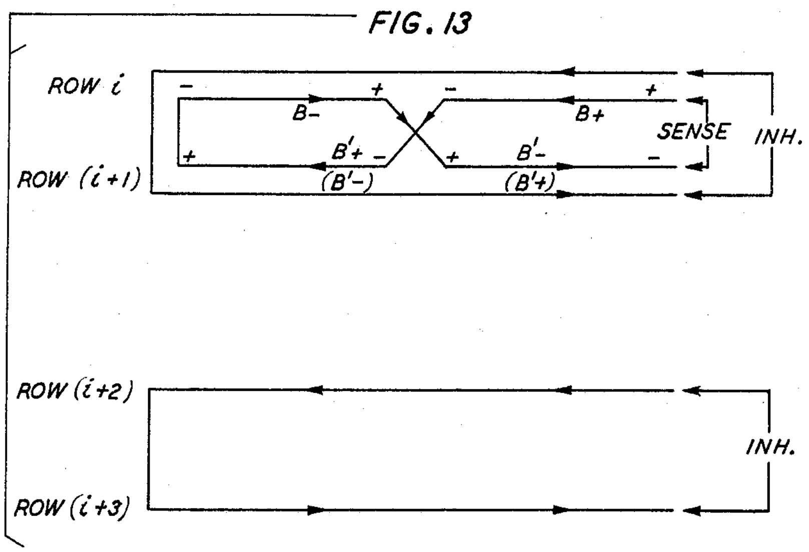

FIG. 13 shows a further extension of complementing used to reduce the effects of coupling to a sense lead from the inhibit lead of an adjacent pair of memory planes. Such coupling may be called a neighbor effect. This embodiment of the invention is herein called type II row crossing. If it is assumed for a moment that the inhibit lead of row $i+2$ in FIG. 13 is adjacent to the row $i+1$ in FIG. 12, it can be determined that there is a distributed capacitive coupling from that inhibit lead to the sense lead portions of row $i+1$ in FIG. 12. This coupling produces a plus signal in the B′ pattern of row $i+1$ and a plus signal in the B portion of row $i+1$ as indicated by the pattern designations in the parentheses in that figure. The result is a noise on the sense lead in row $i+1$ of FIG. 12 which is significant once column noise and end link noise have been suppressed in the manner previously described. Row $i+3$ is sufficiently remote that it causes no significant neighbor effect on row $i+1$.

Neighbor noise is now suppressed in accordance with the embodiment of FIG. 13 by interchanging the B and B′ interior patterns of the folded planes in FIG. 13 with respect to the positions which they held in FIG. 12. Now the neighbor noise coupled to row $i+1$ in FIG. 13 from the inhibit lead in row $i+2$ in suppressed as can be seen by the pattern designations in parentheses in FIG. 13. This is current complementing since the sense lead lacing pattern progressions are in opposite directions with respect to the row $i+2$ inhibit current direction. The benefits of row crossing and folded plane complementary wiring are retained, as evidenced by the other pattern designations and polarity signs in FIG. 13.

Figure 14:
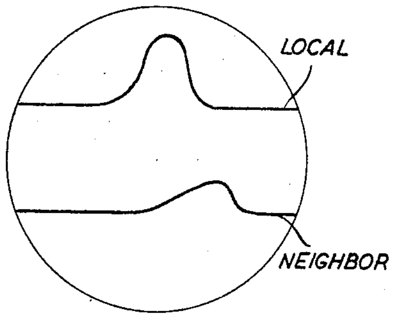
FIGS. 14 through 17 are sketches of oscilloscope traces demonstrating the improved results that may be achieved by utilizing circuit embodiments of the invention.

FIG. 14 shows a sketch of oscilloscope traces of local and neighbor noise signals coupled to the sense lead of a magnetic memory of the type illustrated in FIG. 1 but with no complementary wiring whatsoever. This indicates a single local noise pulse of substantial magnitude and a neighbor noise pulse of substantial, but of somewhat smaller, magnitude. These pulses obviously have a significant direct current component and cannot therefore, be easily filtered to negligible magnitude in the sense circuit without also destroying desired information pulses of similar shape in that circuit.

Figure 15:
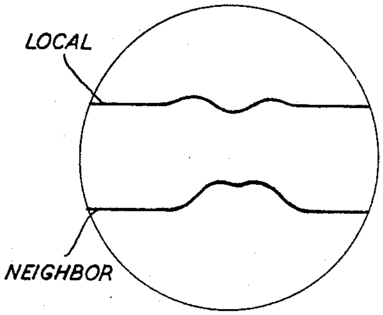
Figures 16, 17:
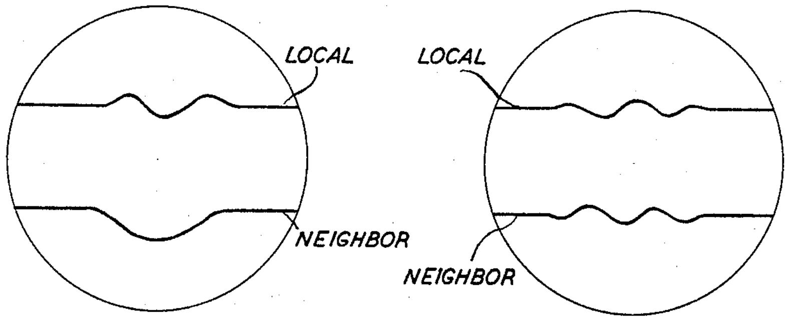

FIGS. 15 through 17 show the results in the same sense circuit that are produced by the application of folded plane complementary wiring, type I row crossing, and type II row crossing, respectively. FIG. 17 is of particular interest since it includes the effects of all of the three previously described embodiments of the invention. In all three of the FIGS. 15 through 17 the local noise appears as a few cycles of small amplitude oscillation. These oscillations are the result of a single noise pulse after the effects of that pulse have been reduced by the indicated forms of complementary wiring. Since these oscillations have a negligible direct current component and are of a higher frequency than the signal pulse which produced them, they may be readily filtered to eliminate further the effect upon the output of the sense circuit. Low pass filter 27 of FIG. 1 performs such a function and may be used or not in any of the described embodiments depending upon whether further reduction in noise amplitude is required.

The effects of neighbor noise are reduced somewhat in the folded plane embodiment and with type I row crossing as shown in FIGS. 15 and 16, but the direct attack upon neighbor noise described in connection with FIG. 13 produces a series of a few cycles of low amplitude oscillation in the same manner as previously described in connection with the local noise. Thus, the same filter 27 can also be used to accomplish further attenuation of the reduced neighbor noise effect without significantly affecting the desired information pulses which must be coupled through the amplifier 28 in FIG. 1.

Although the present invention has been described and illustrated in connection with particular embodiments and variations thereof, it is to be understood that additional embodiments and variations utilizing the principles of the invention, and which will be obvious to those skilled in the art, are included within the spirit and scope of the invention.

What is claimed is:

1. An electric signal translation circuit comprising
a current pulse source having two output terminals one of which is grounded,
a transformer having primary and secondary windings and connected on its primary side to said terminals,
a first conductor connected across said secondary winding with no direct connection to ground,
a second conductor connected in an electric circuit loop which is isolated from ground,
output connections, one of which is grounded,
means coupling said second conductor to said connections,
said first and second conductors each including first and second pluralities of segments,
said first conductor having a current of a particular polarity applied thereto from said source,
said first and second segments of said first conductor being substantially parallel to, and coupled by distributed capacity to, corresponding first and second segments of said second conductor, respectively, to complete a leakage current path from said source through said conductors, said output connections, ground, and back to said source, and
said first segments of said second conductor being connected in series-opposing relationship in such conductor with respect to said second segments thereof for current coupled to such conductor by said capacity.

2. An electric signal circuit comprising
first and second leads, each lead having plural segments physically arranged substantially parallel to, and in such close proximity to, corresponding segments of the other lead that there is significant distributed capacitive coupling between such segments,
means applying pulses to said second lead, the configuration of said pulses in said second lead being changed in a predetermined manner by said capacitive coupling during transmission therethrough,
means constraining different adjacent ones of said first lead segments in positions with opposite senses with respect to corresponding adjacent segments of said second lead to which they are capacitively coupled, respectively, for producing signals of opposite polarities in said first lead in response to said pulses, whereby a first order cancellation of coupled signals is accomplished with a resulting cancellation error signal,
each said error signal having a magnitude which is a function of the relative magnitudes of a pair of said signals of opposite polarities coupled to said first lead segments and said error signal having the same polarity as the larger of such pair of opposite polarity signals, and
said constraining means further arranging said first and second lead segments for accomplishing additional orders of coupled signal cancellations wherein each $2^n$th order cancellation is performed between two of said cancellation error signals of opposite polarity from adjacent $2^{(n-1)}$th order cancellations, where $n$ is the ordinal number of the additional order of cancellation beyond said first order cancellation.

3. The electric signal translation circuit in accordance with claim 2 in which
a filter is connected in circuit with said first lead for attenuating signals at frequencies outside of a frequency range including said pulses to a much greater extent than signals within said range.

4. The electric signal translation circuit in accordance with claim 2 wherein
said constraining means comprises means positioning said leads in a three-dimensional array of circuit paths defining plural surfaces of evolution,
each of said leads includes end link sections interconnecting in series the lead segments in said paths defining each such surface, said distributed capacitance also coupling the end link sections of said two leads together, and each of said leads has additional end link sections adapted for interconnecting a lead segment in one surface of said array to another lead segment in a second surface of said array, one of said leads having more of said additional end links than does the other.

5. The electric signal translation circuit in accordance with claim 2 wherein said constraining means comprises, for at least one of said additional orders of cancellation, pattern complementing means positioning some segments of said first lead in association with corresponding segments of one part of said second lead in accordance with a pattern of current direction relationships among such segments of such leads which is adapted for producing a net coupled signal of a first polarity in said first lead and positioning other segments of said first lead in association with segments of another part of said second lead in accordance with a different pattern of current direction relationships among such other lead segments which is adapted for producing a net coupled signal of a second polarity in said first lead.

6. The electric signal translation circuit in accordance with claim 2 wherein electric current signals in said second lead are by said distributed capacitive coupling deformed in one part of said second lead and reformed in another part of said second lead, and said constraining means includes distortion complementing means positioning some segments of said first lead in association with said one part of said second lead in a predetermined pattern of current direction relationships for producing a net coupled signal of a first polarity in said first lead and positioning other segments of said first lead in association with said other part of said second lead in accordance with said pattern for producing a net coupled signal of a second polarity in said first lead.

7. The electric signal translation circuit in accordance with claim 2 wherein, each of said first lead segments is operative in each of said orders of coupled signal cancellation and the number of segments included in a cancellation increases in size in accordance with a geometrical algorism as the order of cancellation increases.

8. The electric signal translation circuit in accordance with claim 7 in which, considering the segments of said second lead in a predetermined sequence, a pattern of lead segment signal polarities is formed in the first lead segments of the first half of said sequence and is duplicated in the second half of said sequence.

9. The electric signal translation circuit in accordance with claim 2 in which said constraining means comprises a three-dimensional array of magnetic core devices, said leads each lace all cores of two parallel planes of core columns of said array, said segments of said leads comprise the lead segments within the respective columns in each of said planes, and the first lead groups in the columns in each half of each of said planes are arranged in patterns of current direction polarities tending to produce at least a first order cancellation of signals coupled to said first lead by said distributed capacitive coupling.

10. The electric signal translation circuit in accordance with claim 9 in which, considering halves of said planes in the sequence in which traversed by said second lead, the lead groups of said first lead are connected in series in the order named through the first half plane in the sequence of said second lead in accordance with a first current direction polarity pattern, the third half plane in the reverse of said second lead sequence in accordance with a second current polarity pattern, the second half plane in the reverse of the sequence of said second lead and in accordance with said first pattern, and through the fourth half plane in the sequence of said second lead and in accordance with said second pattern.

11. The electric signal translation circuit in accordance with claim 9 in which said patterns in each half of a first one of said planes are different and the net effects of cancellations in the two halves of each plane tend to oppose one another, and said patterns in the two halves of the other one of said planes are the same as those in said first plane.

12. The electric signal translation circuit in accordance with claim 11 in which the groups of said first lead include in series in the order named, and in the sequence in which said second lead traces the respective halves of said planes, the groups in the first and second halves of said first plane, and the groups in the first and second halves of said second plane.

13. The electric signal translation circuit in accordance with claim 11 in which, considering the halves of said planes in the sequence in which traversed by said second lead, the lead groups of said first lead are connected in series in the order named through the first half plane in the sequence of said second lead, the third half plane in the reverse of the sequence of said second lead, the second half plane in the reverse of the sequence of said second lead, and the fourth half plane in the sequence of said second lead.

14. In a magnetic memory wherein an output signal sensing circuit links plural magnetic devices which are differently excited by memory drive circuits linked thereto, thereby producing a desired sensing circuit signal by magnetic coupling at a selected one of said devices and similarly producing by magnetic coupling noise signals at certain other of said devices, and said sensing circuit also receiving additional noise signals by distributed capacitive coupling to said drive circuit, said sensing circuit includes first and second pluralities of circuit segments which are arranged to receive by said magnetic coupling and said distributed capacitive coupling signals of opposite polarities to accomplish a first order noise signal cancellation, means arranging said segments to accomplish additional orders of noise cancellation upon noise error signals from said first order cancellations so that the net noise coupled to said sensing circuit has an alternating current form with a fundamental frequency substantially higher than the fundamental operating frequency of said memory, and a low-pass filter coupled to said sensing circuit and having a cutoff frequency between said frequency of said noise form and said memory frequency.

15. An electric signal translation circuit comprising a first conductor and a second conductor, both of said conductors floating with respect to ground, at least a portion of each of said first and second conductors being arranged in such close proximity to one another that there is significant distributed capacitive coupling of signals therebetween, each of said portions including plural corresponding conductor segments, means applying current pulses of a predetermined polarity to said first one of said conductors thereby producing corresponding signals in said second conductor via said capacitive coupling, and means constraining said conductor segments in positions wherein different segments of said second conductor have opposite senses with respect to said corresponding first conductor segments so that different ones of said corresponding signals have opposite polarities for accomplishing a first order cancellation of said corresponding signals with resulting cancellation error signals of predetermined polarities, said second conductor segment positions being further characterized in that plural successive additional orders of coupled signal cancellations are accomplished among said error signals in said second conductor.

16. The electric signal translation circuit in accordance with claim 15 in which said current pulses occur in a predetermined frequency range, and a filter is connected in circuit with said second conductor for attenuating signals at frequencies outside of said range to a much greater extent than impulses within said range.

17. In a magnetic memory which comprises a coordinate array of magnetic core members including columns of said members, a first lead and a second lead conducting electric currents through the same ones of said columns of members and forming an equivalent balanced transmission line, said first lead conducting current in a predetermined sequence of said columns of members, said second lead conducting electric current through the first and second columns of said sequence in the same direction as said first lead, said second lead further conducting current through the fourth and third columns of said sequence in that order with a current direction which is opposite to the direction in said first lead thereby establishing in said first through fourth columns a first pattern of relative current directions, said second lead also conducting current through the fifth through eighth columns of said sequence to establish therein a second relative current direction pattern which is the complement of said first current direction pattern, said first and second patterns forming together a first overall current direction pattern, and said second lead conducting current through at least one additional group of columns of said sequence to establish a further relative current direction pattern in each additional group which is the complement of the overall current direction pattern of all preceding column groups in said sequence.

18. In a magnetic memory, a first plurality of magnetic cores, first and second leads for conducting electric currents through said cores, said leads forming an equivalent balanced transmission line and having a distributed capacity therebetween, said leads both linking some of said cores in the same current sense and others in opposite current sense in accordance with a pattern tending to effect substantial cancellation in said second lead of electric current coupled thereto from said first lead by said distributed capacity, and at least one additional plurality of cores also linked by said leads in accordance with the algorism that the current sense pattern of linkages in each additional plurality of cores must be the complement of the entire pattern of all pluralities of cores prior to the addition.

References Cited by the Examiner

UNITED STATES PATENTS

| | | | |
|---|---|---|---|
| 2,732,542 | 1/1956 | Minnick | 340—174 |
| 3,015,092 | 12/1961 | De Gall | 340—174 |
| 3,161,860 | 12/1964 | Grooteboer | 340—174 |

OTHER REFERENCES

Atwood, L. W.: "Crosstalk Elimination," in IBM Technical Disclosure Bulletin, volume 3, No. 10, pp. 105–106, March 1961.

References Cited by the Applicant

UNITED STATES PATENTS

| | | |
|---|---|---|
| 2,897,482 | 7/1959 | Rosenberg. |
| 3,008,130 | 11/1961 | Devaud et al. |
| 3,214,740 | 10/1965 | Booth. |

OTHER REFERENCES

"Magnetic Cores, Characteristics and Applications," by R. Stuart-Williams, at pp. 56–61 in Automatic Control, May 1961.

BERNARD KONICK, *Primary Examiner.*

IRVING SRAGOW, *Examiner.*

H. D. VOLK, S. URYNOWICZ, *Assistant Examiners.*